United States Patent
Durand et al.

[11] Patent Number: 6,076,768
[45] Date of Patent: Jun. 20, 2000

[54] SECOND-CLASS TWO-SEATER SEAT THAT CAN BE CONVERTED INTO A FIRST-CLASS SINGLE-SEATER SEAT AND VICE VERSA AND METHOD OF CONVERTING SUCH A SEAT

[75] Inventors: François Durand, Rochefort; Alain Guinot, Thaire, both of France

[73] Assignee: Alstom Transport SA, Paris, France

[21] Appl. No.: 09/249,557

[22] Filed: Feb. 12, 1999

[30] Foreign Application Priority Data

Feb. 12, 1998 [FR] France .................................. 98 01679

[51] Int. Cl.⁷ .................................................. B64D 11/06
[52] U.S. Cl. .................................. 244/118.6; 244/122 R; 297/257; 297/232; 297/411.37
[58] Field of Search ............................ 244/122 R, 118.5, 244/118.6; 297/115, 118, 130, 232, 233, 257, 107, 124, 394, 248, 452.4, 411.37

[56] References Cited

U.S. PATENT DOCUMENTS

| | | | |
|---|---|---|---|
| 2,291,377 | 7/1942 | Clark | 297/115 |
| 4,881,702 | 11/1989 | Slettebak | 244/118.6 |
| 5,180,120 | 1/1993 | Simpson et al. | 244/118.6 |
| 5,193,765 | 3/1993 | Simpson et al. | 244/118.6 |
| 5,509,722 | 4/1996 | Beroth | 297/232 |
| 5,597,139 | 1/1997 | Beroth | 244/118.6 |
| 5,727,845 | 3/1998 | Jackson-wynch | 244/118.6 |
| 5,775,642 | 7/1998 | Beroth | 244/118.6 |

FOREIGN PATENT DOCUMENTS

| | | |
|---|---|---|
| 2 711 967 | 5/1995 | France . |
| 43 37 941 | 5/1995 | Germany . |

*Primary Examiner*—Galen Barefoot
*Attorney, Agent, or Firm*—Young & Thompson

[57] ABSTRACT

A second-class two-seater seat (1) that can be converted into a first-class single-seater seat, and vice versa. The second-class two-seater seat comprises two seats (2) two seat cushions (3) and two armrests (4). The two-seater (1) comprises elements (5) for translating at least one of the seat cushions (3) and at least one of the two armrests (4), the seat cushions (3) and the armrests (4) remaining mutually aligned. Translations of the seat cushions and the armrests are obtained by the translation element's (5), allowing the seat cushions that are to be translated and the armrests that are to be translated to be brought closer together when the second-class two-seater seat is converted into a first-class single-seater seat, or the seat cushions that are to be translated and the armrests that are to be translated to be moved further apart when the first-class single-seater seat is converted into a second-class two-seater seat.

16 Claims, 6 Drawing Sheets

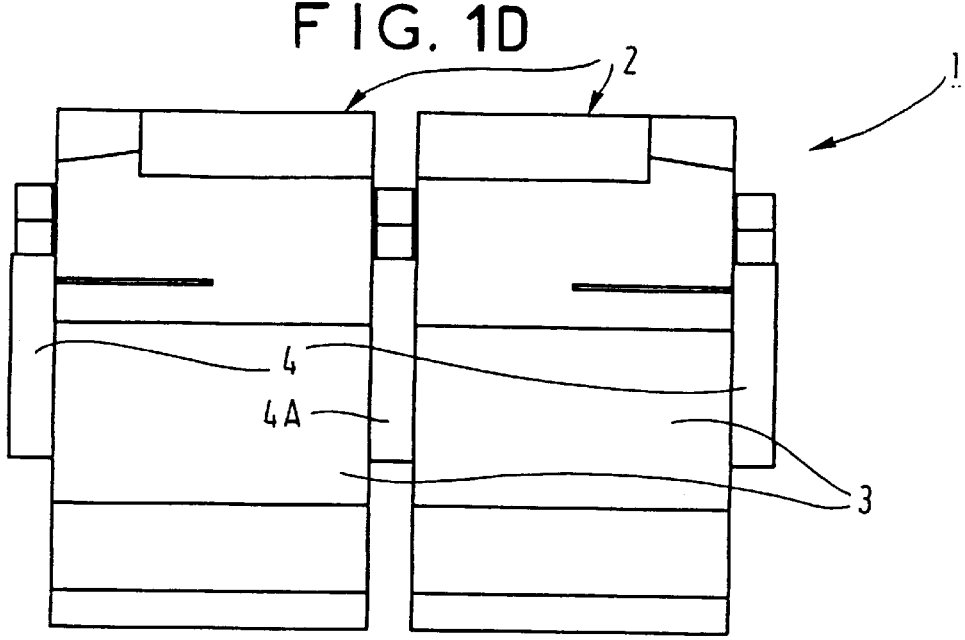
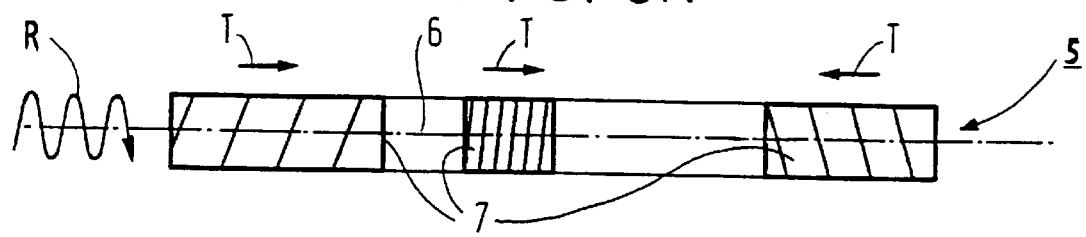
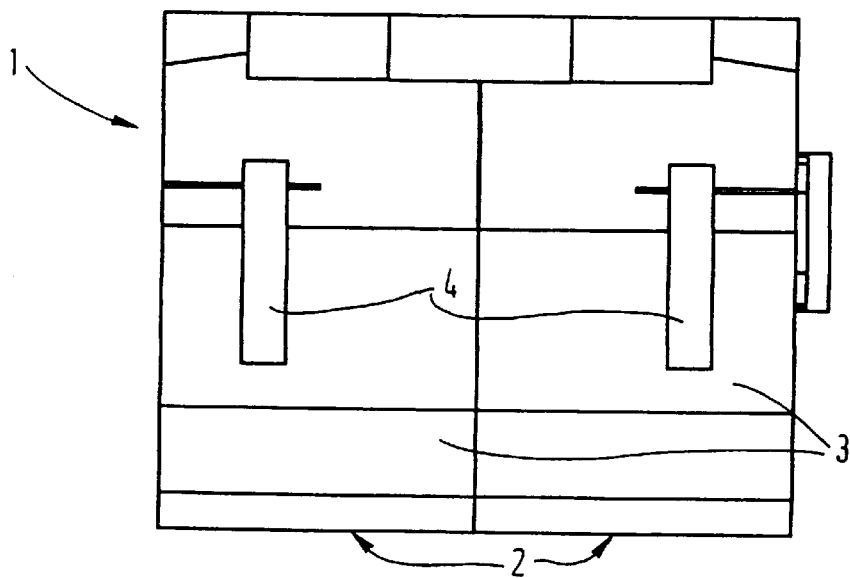

SECOND-CLASS TWO-SEATER SEAT THAT CAN BE CONVERTED INTO A FIRST-CLASS SINGLE-SEATER SEAT AND VICE VERSA AND METHOD OF CONVERTING SUCH A SEAT

FIELD OF THE INVENTION

The present invention relates to first- and second-class seats, particularly for public transport vehicles, in general, and relates more specifically to a second-class two-seater seat that can be converted into a first-class single-seater seat and vice versa, and to a method for converting such a seat.

The only solution currently available for changing a first-class seat into a second-class seat and conversely for changing a second-class seat into a first-class seat, particularly in a public transport vehicle area is to replace the seats.

Thus, the only way of changing the category of the area in a road or rail public-transport vehicle is to replace the seats.

SUMMARY OF THE INVENTION

Thus, an object of the invention is a second-class two-seater seat of a first predetermined width that can be converted into a first-class single-seater seat of a second predetermined width, and vice versa that will allow an area of a given class to be converted into an area of another class without removing seats.

More generally, the object of the invention is to provide a second-class N-seater seat (where N is a whole number) that can be converted into a first-class N-1-seater seat and vice versa, both for N=2 and for N>2.

In accordance with the invention, the second-class two-seater seat that can be converted into a first-class single-seater seat and vice versa and the method of converting such a seat are as characterized below.

One advantage of the second-class two-seater seat that can be converted into a first-class single seater seat and vice versa and of the method of converting such a seat of the invention is that the time taken to convert an area from a given class into an area of another class is very short and allows the capacity of the train to be increased on the spot.

Another advantage of the second-class two-seater seat that can be converted into a first-class single-seater seat and vice versa and of the method of converting such a seat of the invention is that it offers an operator twice as many seats in the trailers initially designed solely for first class, this making it possible to alleviate the problems of variations in demand between weekends and weekdays for example.

Another advantage of the second-class two-seater seat that can be converted into a first-class single-seater seat and vice versa and of the method of converting such a seat of the invention is that it optimizes the number of seats offered on trains which do not change in terms of the number of trailers.

BRIEF DESCRIPTION OF THE DRAWINGS

Other objects, characteristics and advantages of the invention will emerge from reading the description of two preferred embodiments of a second-class two-seater seat that can be converted into a first-class single-seater seat and vice versa and the description of the method for converting such a seat, which description is given in conjunction with the drawings in which:

FIG. 1D depicts a plan view of the second-class two-seater seat that can be converted into a first-class single-seater seat and vice versa in accordance with the invention depicted in FIG. 1A, in which the seat is converted to form a second-class two-seater seat, FIG. 2D depicts a plan view of the second-class two-seater seat that can be converted into a first-class single-seater seat and vice versa in accordance with the invention depicted in FIG. 2A, in which the seat is converted to form a first-class single-seater seat, FIG. 3A depicts the means of translating the armrests and seat cushions of the second-class two-seater seat that can be converted into a first-class single-seater seat and vice versa in accordance with the invention.

DETAILED DESCRIPTION OF THE PREFERRED EMBODIMENTS

Figure 1A:
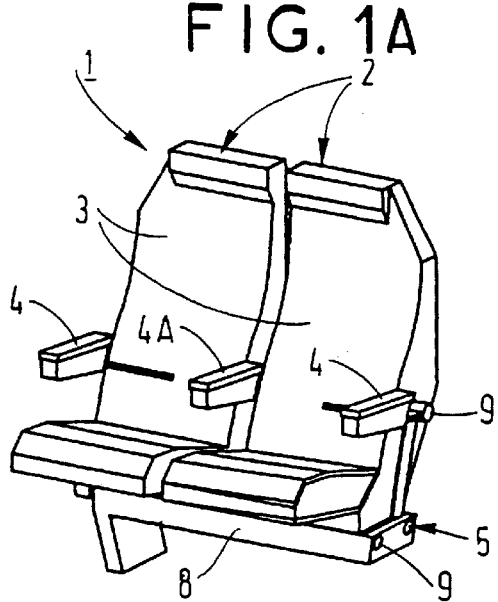
FIG. 1A is an overall view of a second-class two-seater seat that can be converted into a first-class single-seater seat and vice versa in accordance with the invention, the seat being converted to form a second-class two-seater seat.
Figure 1B:
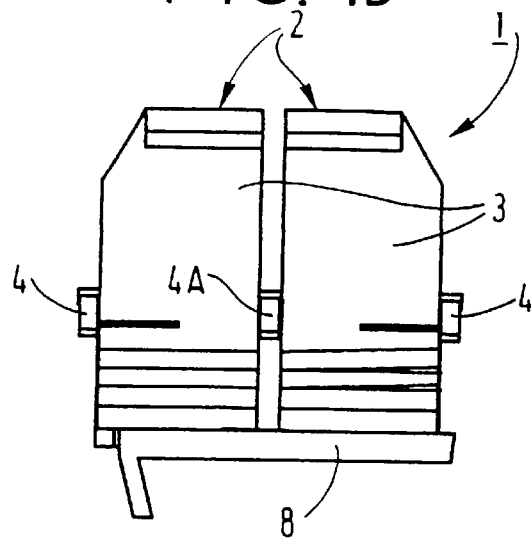
FIG. 1B is a front view of the second-class two-seater seat that can be converted into a first-class single-seater seat and vice versa in accordance with the invention depicted in FIG. 1A, in which the seat is converted to form a second-class two-seater seat.
Figure 2A:
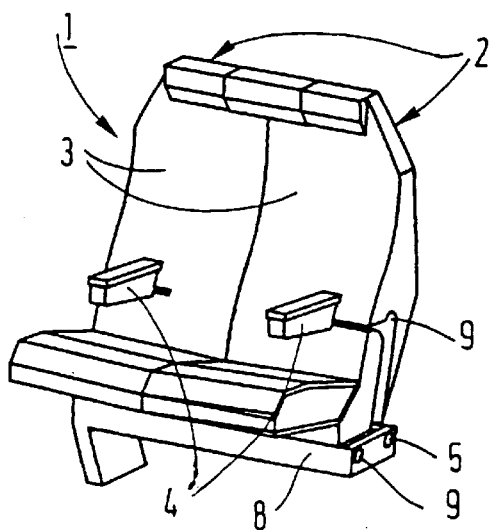
FIG. 2A is an overall view of a second-class two-seater seat that can be converted into a first-class single-seater seat and vice versa in accordance with the invention, the seat being converted to form a first-class single-seater seat.
Figure 2B:
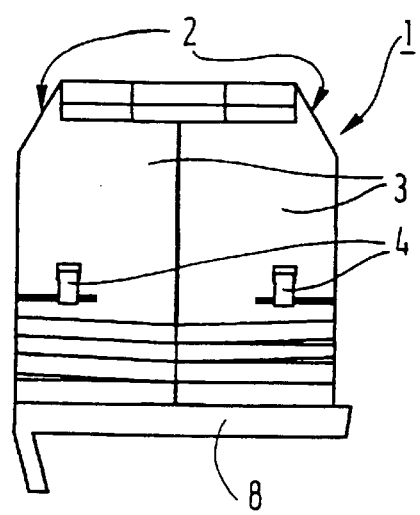
FIG. 2B is an overall view of the second-class two-seater seat that can be converted into a first-class single-seater seat and vice versa in accordance with the invention depicted in FIG. 2A, in which the seat is converted to form a first-class single-seater seat.
Figure 1C:
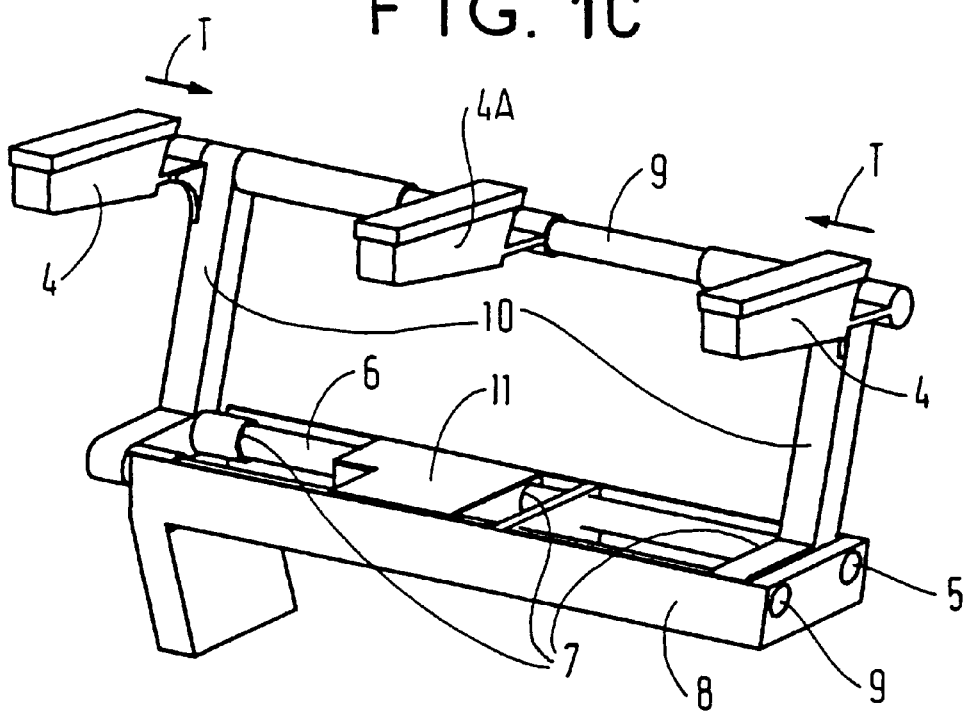
FIG. 1C is an overall view of the chassis of the second-class two-seater seat that can be converted into a first-class single-seater seat and vice versa in accordance with the invention depicted in FIG. 1A, in which the seat is converted to form a second-class two-seater seat.
Figure 2C:
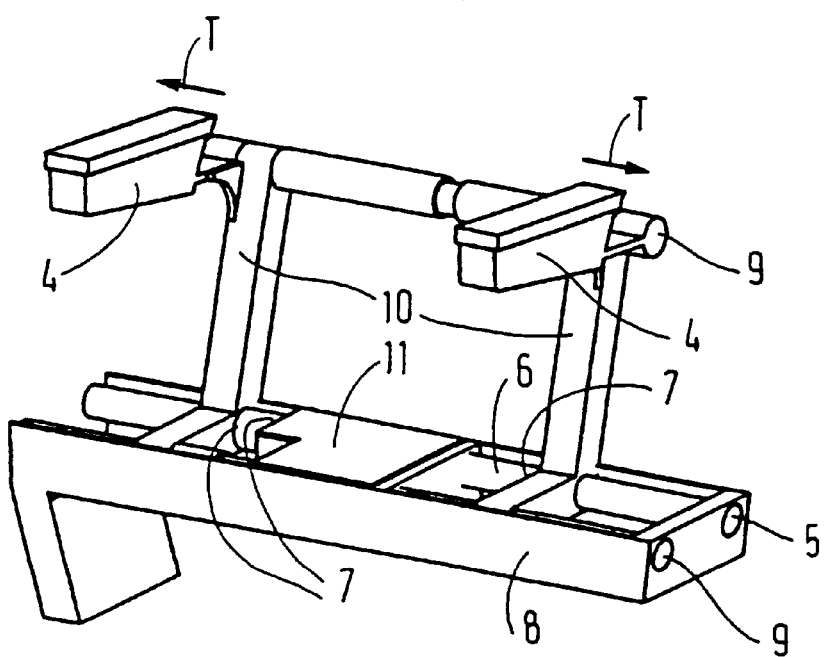
FIG. 2C is an overall view of the chassis of the second-class two-seater seat that can be converted into a first-class single-seater seat and vice versa in accordance with the invention depicted in FIG. 2A, in which the seat is converted to form a first-class single-seater seat.
Figure 1E:
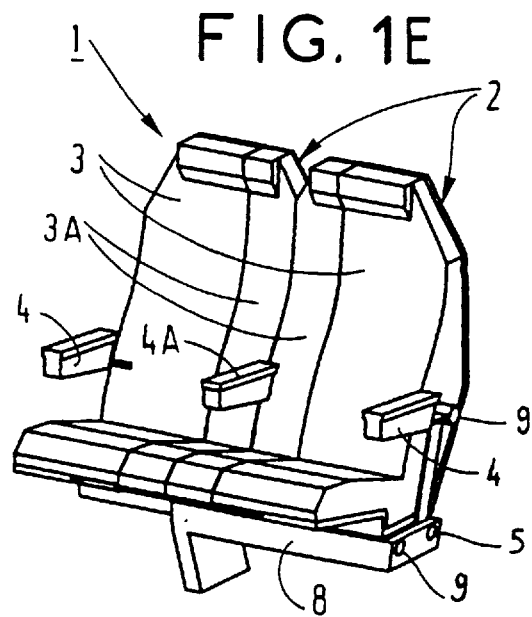
FIGS. 1E, 2E, 1F, 2F, 1G, 2G, 1H, 2H, and 3B are views of the same type as the previous views and depicting the second preferred embodiment of the second-class two-seater seat that can be converted into a first-class single-seater seat and vice versa in accordance with the invention.
Figure 1F:
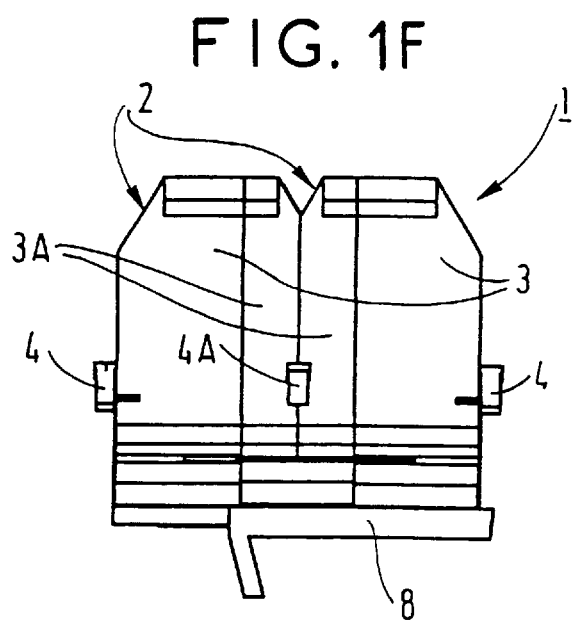
Figure 2E:
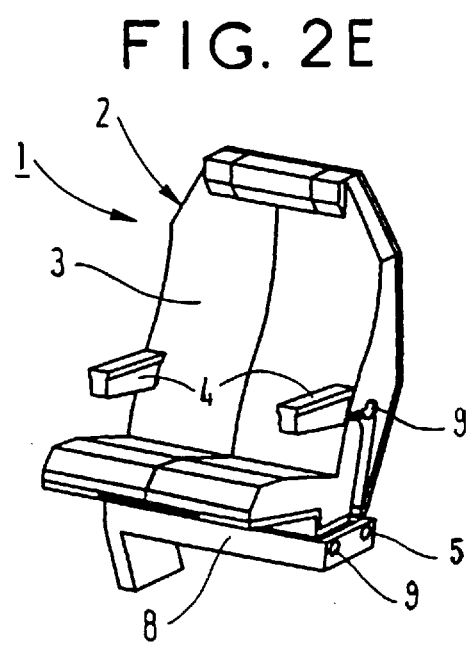
Figure 2F:
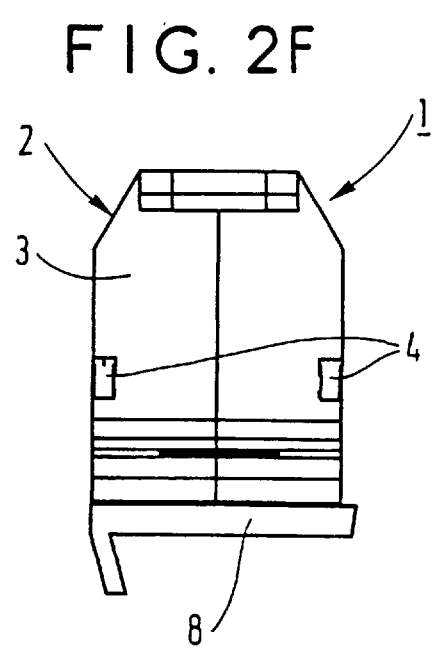
Figure 1G:
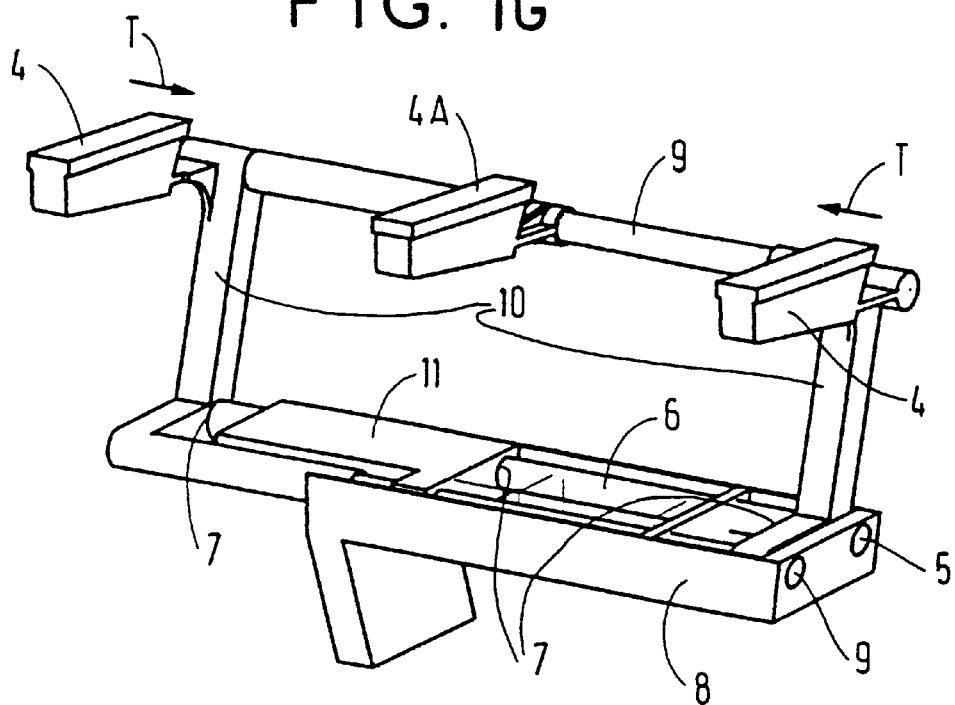
Figure 2G:
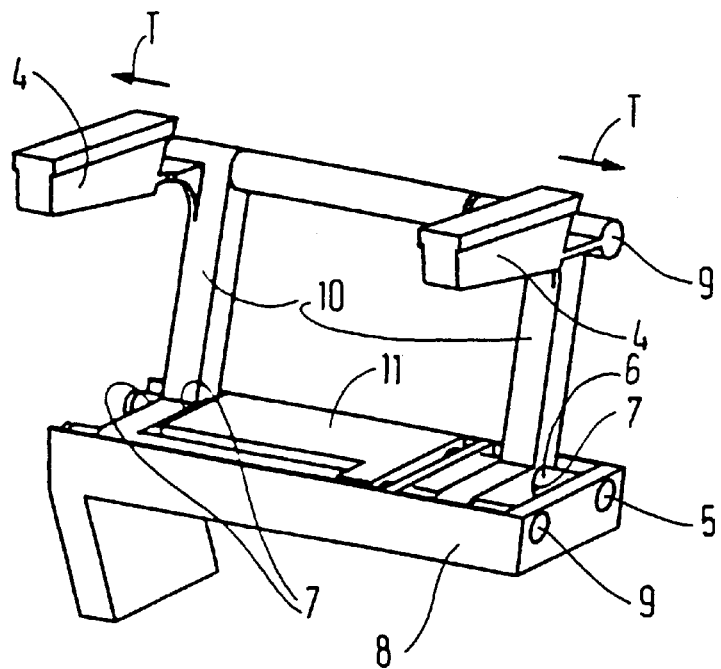
Figure 1H:
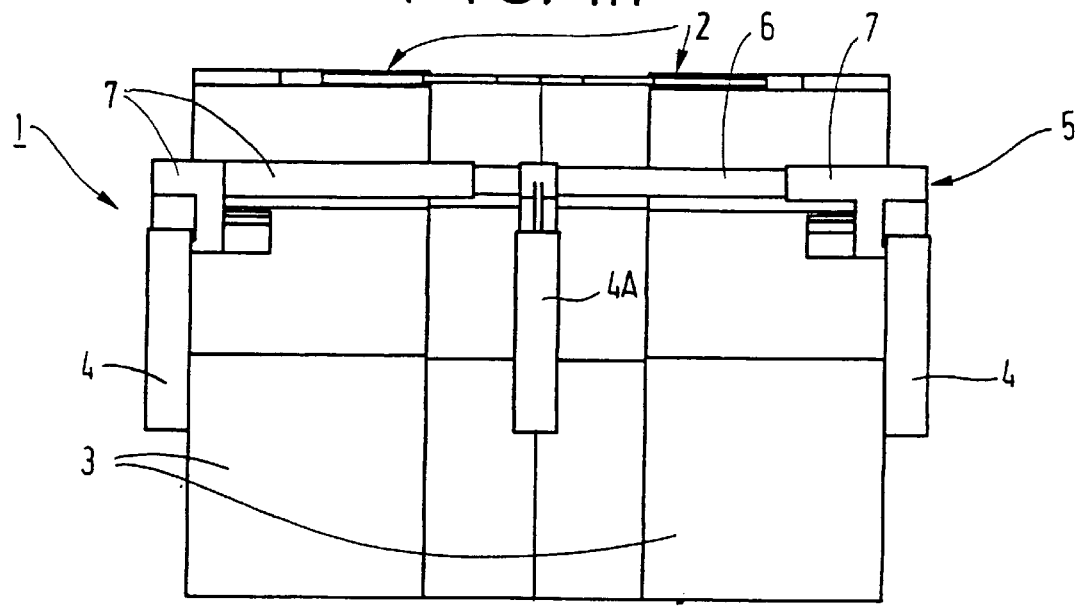

The present invention consists in keeping the seats that form the second-class two-seater seat that can be converted into a first-class single-seater seat and vice versa which has a given number of seating spaces and in changing the position of some of these seats so as to alter the width of the seat fixture.

The second-class two-seater seat of the invention is converted into a first-class single-seater seat by moving the seat cushions and armrests of the second-class two-seater seat further apart.

The first-class single-seater seat of the invention is converted into a second-class two-seater seat by moving the seat cushions and armrests of the first-class single-seater seat closer together.

The second-class two-seater seat 1 can be converted into a first-class single-seater seat and vice versa.

The second-class two-seater seat 1 that can be converted into a first-class single-seater seat comprises two seats 2 with two seat cushions 3 and three armrests 4, 4A.

The central armrest 4A arranged between each seat 2 is removed when the second-class two-seater seat is converted into a first-class single-seater seat and is then refitted when the first-class single-seater seat is converted into a second-class two-seater seat.

The second-class two-seater seat 1 that can be converted into a first-class single-seater seat comprises means 5 for translating at least one of the two seat cushions 3 and at least one of the two armrests 4.

The two seat cushions 3 and the two armrests 4 remain mutually aligned after translation.

FIGS. 1E, 2E, 1F, 2F, 1G, 2G, 1H, 2H and 3B are views of the same type as the previous views and depict the second preferred embodiment of the second-class two-seater seat that can be converted into a first-class single-seater seat and vice versa in accordance with the invention.

The second-class two-seater seat 1 that can be converted into a first-class single-seater seat comprises two seats 2 with two seat cushions 3 and three armrests 4, 4A.

The two seat cushions 3 are at least partially demountable and therefore comprise demountable part seat cushions 3A.

These demountable part seat cushions 3A are preferably arranged near the centre of the second-class two-seater seat that can be converted into a first-class single-seater seat.

Another embodiment, not depicted, consists in arranging these demountable part seat cushions at the end of the second-class two-seater seat that can be converted into a first-class single-seater seat.

The demountable part seat cushions 3A are removed from the seat when the second-class two-seater seat is converted into a first-class single-seater seat, then refitted when the first-class single-seater seat is converted into a second-class two-seater seat.

The central armrest 4A arranged between each seat 2 is removed when the second-class two-seater seat is converted into a first-class single-seater seat and is then refitted when the first-class single-seater seat is converted into a second-class two-seater seat.

Figure 3B:
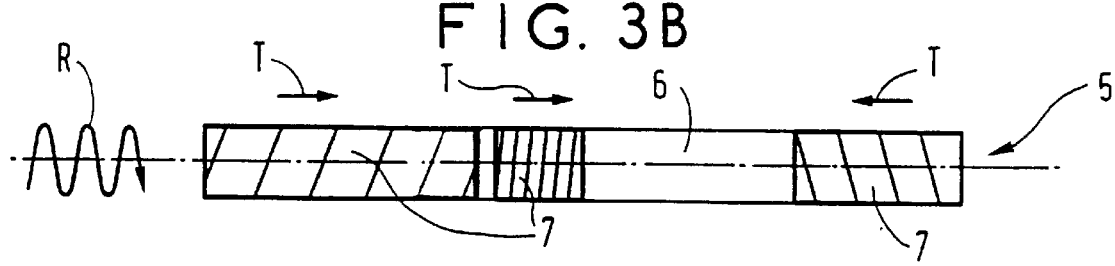
Figure 2H:
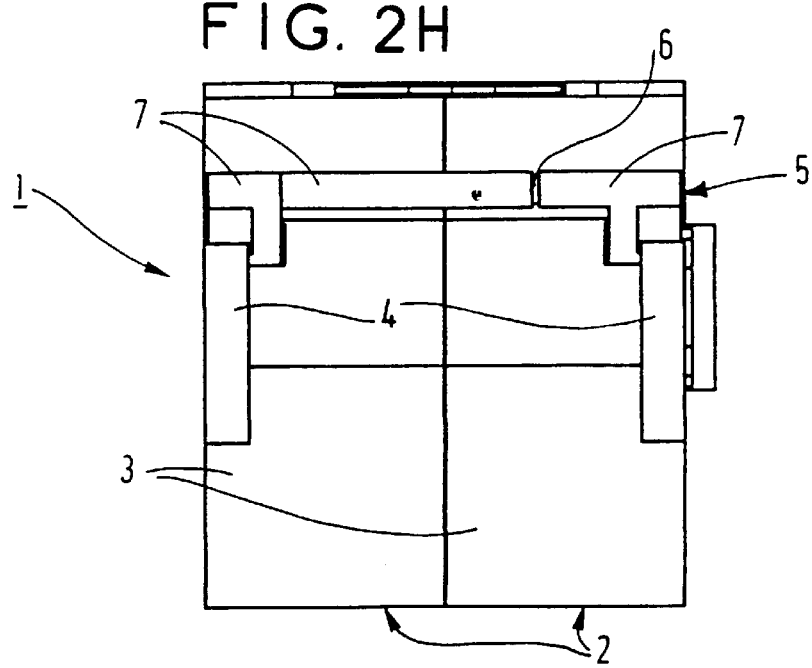

FIGS. 3A and 3B depict the means of translating the armrests and the seat cushions of the second-class two-seater seat that can be converted into a first-class single-seater seat and vice versa in accordance with the invention.

In the two preferred embodiments, the translations T of the seat cushions and of the armrests are achieved by means of translation means 5 so as to bring the seat cushions that are to be translated and the armrests that are to be translated closer together when the second-class two-seater seat is converted into a first-class single-seater seat, or so as to move the seat cushions that are to be translated and the armrests that are to be translated further apart when the first-class single-seater seat is converted into a second-class two-seater seat.

The seat is, for example, such that during the conversion, at least one seat cushion 3 is fixed, for example the seat cushion at one of the ends.

The means 5 for translating the seat cushions 3 that are to be translated and the armrests 4 that are to be translated are made up of a translation shaft 6 which can be rotated R and comprises a translation element 7 associated with each armrest 4 that is to be translated and each seat cushion 3 that is to be translated.

In accordance with the preferred embodiments, the translation elements 7 for the armrests 4 and the seat cushions 3 that are to be translated are made up of variable-pitch screws of which the screw pitch and length of the active region comprising the screw thread increases with the separation between the armrests 4 that are to be translated and the seat cushions 3 that are to be translated with respect to the fixed armrests 4 and seat cushions 3.

The screw threads of the translation elements 7 are either left-hand threads in the case of some of these translation elements 7 or right-hand threads in the case of the other translation elements 7, and depend on the transformation T that is to be achieved.

The seat according to the invention comprises a chassis 8 supporting the translation shaft 6 and at least one shaft 9 for guiding the armrests 4 that are to be translated and the seat cushions 3 that are to be translated.

The translation shaft 6 and the guide shafts 9 support armrest supports 10 that can move in terms of translation and seat cushion supports 11 that can move in terms of translation.

The moving armrest supports 10 that are to be translated are translated by means of the translation elements associated with each armrest that is to be translated.

Likewise, the moving seat cushion supports 11 that are to be translated are translated by means of the translation elements 7 associated with each seat cushion that is to be translated.

The central armrest 4A arranged between each seat 2 is removed when the second-class two-seater seat is converted into a first-class single-seater seat.

This central armrest 4A can then be reused, for example on a first/second-class convertible two-seater seat when the seat is considered as a first-class two-seater seat and therefore needs two armrests per seating space.

As the armrests and seat cushions are, for example, mounted on slideways so as to allow for their relative displacement and translation, the translational movement may either by motorized or manual.

There are various systems that may be used for translating the armrests and the seat cushions that are to be translated; for example, it is possible to use variable-pitch screws, linkages (not depicted) or a set of cams (not depicted).

By way of example, various translations are achieved by manual translation of the armrests and seat cushions that are to be translated, using unthreaded guide.

Stops set the extreme positions of the various elements, overall locking being provided, for example by a catch or pawl system, making it possible to prevent any movement after manoeuvre.

The present invention also relates to a method of converting a second-class two-seater seat that can be converted into a first-class single-seater seat and vice versa.

The method according to the invention comprises steps allowing:

the second-class two-seater seat 1 to be converted into a first-class single-seater seat, the central armrest 4A between each seat 2 to be removed when the second-class two-seater seat is converted into a first-class single-seater seat, or the central armrest 4A to be inserted between each seat 2 when the first-class single-seater seat is converted into a second-class two-seater seat, and at least one of the two seat cushions 3 and at least one of the two armrests 4 that are to be translated by means of translation means 5 incorporated into the second-class two-seater seat 1 that can be converted into a first-class single-seater seat, the two seat cushions 3 and the two armrests 4 remaining mutually aligned.

The method according to the invention may comprise a step which consists in the fact that at least one demountable part seat cushion 3A is removed from the seat when the second-class two-seater seat is converted into a first-class single-seater seat then refitted when the first-class single-seater seat is converted into a second-class two-seater seat.

The method of converting a seat comprises a step which consists in rotating R the translation shaft 6 incorporated in the means 5 for translating the seat cushions 3 that are to be translated and the armrests 4 that are to be translated, by means of translation elements 7 associated with each armrest 4 that is to be translated and each seat cushion 3 that is to be translated.

The method of converting the seat comprises a step consisting in translating moving armrest supports 10 that are to be translated, by means of the translation elements 7 associated with each armrest hat is to be translated, and in translating moving eat cushion supports 11 that are to be translated, by means of the translation elements 7 associated with each seat cushion that is to be translated.

It is clear, given the foregoing, that the second-class two-seater seat that can be converted into a first-class single-seater seat and that the method of converting this seat may be generalized to a second-class N-seater seat (where N is a whole number) that can be converted into a first-class N-1-seater seat and to a method of converting this seat.

In particular, a second-class three-seater seat that can be converted into a first-class two-seater seat and a method of converting such a seat may be produced.

What is claimed is:

1. A convertible second-class two-seater seat assembly that can be converted into a first-class one-seater seat assembly, and vice versa, said second-class two-seater seat assembly comprising:

two seats with two seat cushions;

two external armrests and an intermediate armrest;

translation means for translating at least one movable seat cushion of said seat cushions and at least one movable external armrest of said external armrests;

the intermediate armrest being removable from between the two seats, whereby the second-class two-seater seat assembly can be converted into a first-class one-seater seat assembly by removing said intermediate armrest and translating said one movable external armrest and said one movable cushion to bring the two seat cushions into mutual contact and the two external armrests closer to each other.

2. The seat assembly according to claim 1, wherein the two seat cushions are at least partially demountable so as to comprise at least two respective demountable part seat cushions.

3. The seat assembly according to claim 2, wherein the demountable part seat cushions are arranged at the center of the second-class two-seater seat assembly.

4. The seat assembly according to claim 2, wherein the demountable part seat cushions are arranged at an end of the second-class two-seater seat assembly.

5. The seat assembly according to claim 1, wherein at least one seat cushion is fixed.

6. The seat assembly according to claim 1, wherein the translation means include a translation shaft which can be rotated and comprises translation elements associated respectively with said movable external armrest and said one movable seat cushion.

7. The seat assembly according to claim 6, wherein the translation elements include screw threaded regions of the translation shaft, which regions are of different length and screw pitch.

8. The seat assembly according to claim 6, further comprising a chassis supporting the translation shaft and at least one guide shaft for guiding said one movable external armrest and said one movable cushion.

9. The seat assembly according to claim 7, wherein the screw threads of two translation elements are of opposite directions.

10. A convertible second-class two-seater seat assembly that can be converted into a first-class one-seater seat assembly, and vice versa, said second-class two-seater seat assembly comprising:

two seats with two seat cushions;

two external armrests and an intermediate armrest;

translation means for translating at least one movable seat cushion of said seat cushions and at least one movable external armrest of said external armrests, said translation means structured and arranged for translating each external armrest with respect to a respective seat cushion; and the intermediate armrest being removable from between the two seats, whereby the second-class two-seater seat assembly can be converted into a first-class one-seater seat assembly by removing said intermediate armrest and translating said one movable external armrest and said one movable cushion to bring the two seat cushions into mutual contact and the two external armrests closer to each other.

11. Method of converting a convertible second-class two-seater seat assembly into a first-class one-seater seat assembly, the second-class two-seater seat assembly having two seats with two seat cushions, two external armrests and an intermediate armrest, the method comprising:

removing the intermediate armrest between the two seats; and translating at least one movable seat cushion of the seat cushions and at least one movable external armrest of the external armrests to bring the two seat cushions into mutual contact and the two external armrests closer to each other.

12. The method according to claim 11, further comprising removing at least one demountable part seat cushion of said seat cushions.

13. The method according to claim 11, further comprising rotating a translation shaft incorporated in translation means incorporated into the second-class two-seater seat assembly, whereby said one movable seat cushion and said one movable external armrest are translated.

14. Method of converting a convertible first-class one-seater seat assembly into a second-class two-seater seat assembly, the first-class one-seater seat assembly having two seats with two seat cushions, and two external armrests, the method comprising:

translating at least one movable seat cushion of said seat cushions and at least one movable external armrests of said external armrests to move respectively further apart the two seat cushions and the two external armrests respectively; and inserting an intermediate armrest between the two seats.

15. The method according to claim 14, further comprising adding at least one demountable part seat cushion to said seat cushions.

16. The method according to claim 14, further comprising rotating a translation shaft incorporated in translation means incorporated into the first-class one-seater seat assembly, whereby each of said movable seat cushion and each of said movable external armrests are translated.

* * * * *